(12) United States Patent
Duerbaum et al.

(10) Patent No.: US 6,594,165 B2
(45) Date of Patent: Jul. 15, 2003

(54) CIRCUIT FOR CONVERTING AC VOLTAGE INTO DC VOLTAGE

(75) Inventors: Thomas Duerbaum, Langerwehe (DE); Georg Sauerlaender, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/118,875

(22) Filed: Apr. 9, 2002

(65) Prior Publication Data

US 2002/0176269 A1 Nov. 28, 2002

(30) Foreign Application Priority Data

Apr. 12, 2001 (DE) .......................... 101 18 285

(51) Int. Cl.[7] .............................. H02M 7/00; H02M 1/12
(52) U.S. Cl. ............................... 363/125; 363/44
(58) Field of Search ............................... 363/44, 45, 46, 363/84, 90, 125, 126

(56) References Cited

U.S. PATENT DOCUMENTS

| 4,369,490 | A | * | 1/1983 | Blum .......................... 363/48 |
| 4,801,887 | A | * | 1/1989 | Wegener .................... 328/26 |
| 6,018,472 | A | * | 1/2000 | Vogman .................... 363/126 |
| 6,438,001 | B1 | * | 8/2002 | Duerbaum .................... 363/44 |

* cited by examiner

*Primary Examiner*—Matthew Nguyen
(74) *Attorney, Agent, or Firm*—Edward W. Goodman

(57) ABSTRACT

A circuit for converting an AC voltage into a DC voltage for a device (RL), in which the AC voltage supplied is passed through a large induction coil (L50) and a rectifier (G), includes, on the output side the rectifier (G), two capacitors (C1, C2) connected in parallel, which are separated by a diode (D). In addition, the capacitor C1 positioned closer to the rectifier (G) is discharged, at least in part, via an active converter (20) in the second half of each power supply wave. As a result of which, the current consumption is widened and the system harmonics are reduced. Furthermore, the induction coil (L50) can be dimensioned correspondingly smaller, but can nevertheless meet the relevant standards.

5 Claims, 3 Drawing Sheets

CIRCUIT FOR CONVERTING AC VOLTAGE INTO DC VOLTAGE

BACKGROUND OF THE INVENTION

1. Field of the Invention

The invention relates to a circuit for converting AC voltage into a non-stabilized DC voltage for at least one device, the circuit comprising:
 an AC voltage supply,
 a rectifier module having two inputs connected to the AC voltage supply and outputs connected to two output lines with external terminals for coupling at least one device; and
 at least one induction coil arranged between the AC voltage supply and the rectifier module.

2. Description of the Related Art

A multiplicity of electrical or electronic devices require a DC voltage for their operation, this DC voltage having to be provided or generated from the AC voltage supplied by the power supply system. Representative of such devices are television sets (TV). The circuits for conversion of the AC voltage into DC voltage used in these devices must meet certain requirements concerning their conversion behavior, in particular, in respect of the residual system harmonics content. Such requirements are the subject of standards, of which, particularly, EN 61000-3-2 can be named, which, with effect from 2001, must be complied with in Europe by terminals that have a power input of more than 75 W.

In order to ensure the said quality standards are met, there are a number of different possibilities with varying optimum performance ranges. For high powers, from approximately 500 W upwards, active solutions predominate. In the lower power range, on the other hand, 50 Hz coils are often to be found. They are relatively cheap, but also relatively large and heavy. This size or this concentration of weight leads to problems with the available space on printed circuit boards, or to problems with the impact resistance of the equipment manufactured.

SUMMARY OF THE INVENTION

Against this background, the object of the present invention is to provide a circuit for conversion of AC voltage into a DC voltage for at least one consumer, which guarantees sufficient quality of the conversion behavior with limited space and cost requirements.

This object is achieved in a circuit for converting an AC voltage into a DC voltage for at least one device, comprising:
 (a) An AC voltage supply for providing the AC voltage for conversion;
 (b) A rectifier module having two inputs connected to the AC voltage supply for receiving the AC voltage, and two DC voltage outputs from which corresponding output lines lead with external terminals are connectable to at least one device;
 (c) A main capacitor connected in parallel to a device to be connected between the two external terminals the rectifier module; and
 (d) At least one induction coil arranged in one of the lines connecting the AC voltage supply to the rectifier module, the induction coil smoothing a recharging current or reducing a harmonic content of the recharging current,
characterized in that the circuit also comprises:
 (e) A further capacitor connected in parallel to the main capacitor between the two outputs of the rectifier module;
 (f) At least one diode connected in one of the output lines of the rectifier module, said at least one diode separating the main capacitor from the further capacitor, and being forward-biased relative to the DC voltage output of the rectifier module; and
 (g) An active converter having an input connected between the diode and the rectifier module (and thus to a plate of the further capacitor), and arranged to discharge the further capacitor at least in part in the second half of each half-wave supplied by the AC voltage supply.

The behavior of the input current is altered in an advantageous manner through the further capacitor, which can have a relatively small capacitance, and through the discharge process via the active converter. There is particularly a reduction in the harmonic part. This can, in turn be, used for designing the induction coil to be correspondingly smaller, because the required inductance L can be selected to be smaller. In this way, it is possible to use inductor coils with a drastically reduced size, which can be used when space is limited on printed circuit boards, and to avoid problems with the impact resistance of the devices. Compliance with the relevant standards is also guaranteed.

The active converter may be an up-controller or up-converter. The energy transported by the converter may either be fed to the main capacitor to supply power to the switched-mode regulator ICs of a downstream DC—DC converter or directly to a load on the line voltage-isolated side (secondary side) of a downstream DC—DC converter.

BRIEF DESCRIPTION OF THE DRAWINGS

In the following, the invention will be explained by way of example using the drawings, in which.

DESCRIPTION OF THE PREFERRED EMOBODIMENTS

The generation of DC voltages to supply power to electronic devices from an AC line voltage must meet certain minimum criteria in relation to the conversion of the AC voltage into DC voltage. For devices with a power consumption of more than 75 W, these requirements are, by way of example, set out in the future standard EN 61000-3-2. Various methods for meeting this standard have sought to generate the most exact sinusoidal input current possible. Such a sine waveform is still not specified as mandatory by the standard.

A much-used method of meeting the quality specifications consists of a passive solution using a so-called 50 Hz coil, which smoothes the input current. For this purpose, however, a high inductivity is necessary to comply with, for example, EN 61000-3-2. The corresponding coil is thus very big and heavy, which causes problems for its accommodation on a printed circuit board and for the impact testing of the devices. With the present invention, a circuit is provided that allows the use of smaller coils while, at the same time, the quality specifications for conversion are complied with.

Figure 3:
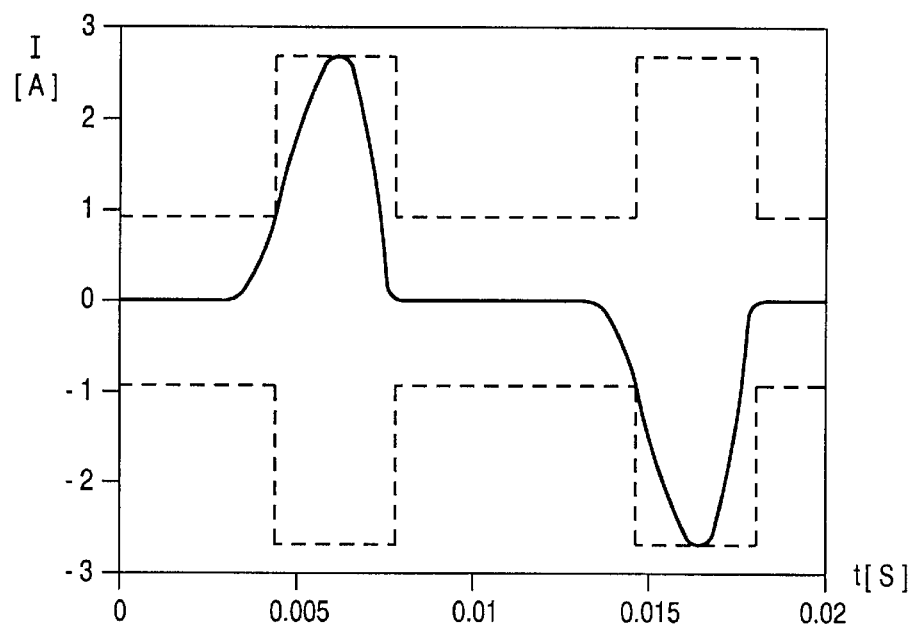
FIG. 3 shows a waveform of the current consumption in a circuit shown in FIG. 1 or 2.

In standard EN 61000-3-2, a distinction is made between classes A to D, where the particular classification of a device depends on various characteristics (such as how easily the device can be moved). For many devices, such as TV sets, classes A to D can usually be applied, the particular classification being dependent on whether the signal form of the current consumed from an AC voltage source deviates or does not deviate by more than 5% from a reference curve defined in the standard. The reference curve is shown in FIG. 3 as a broken-line rectangular curve. If the waveform of a current consumed is more than 5% outside the reference curve, this device comes under class A. This class contains generous limiting values for the higher harmonics which are still allowed in the signal.

Figure 1:
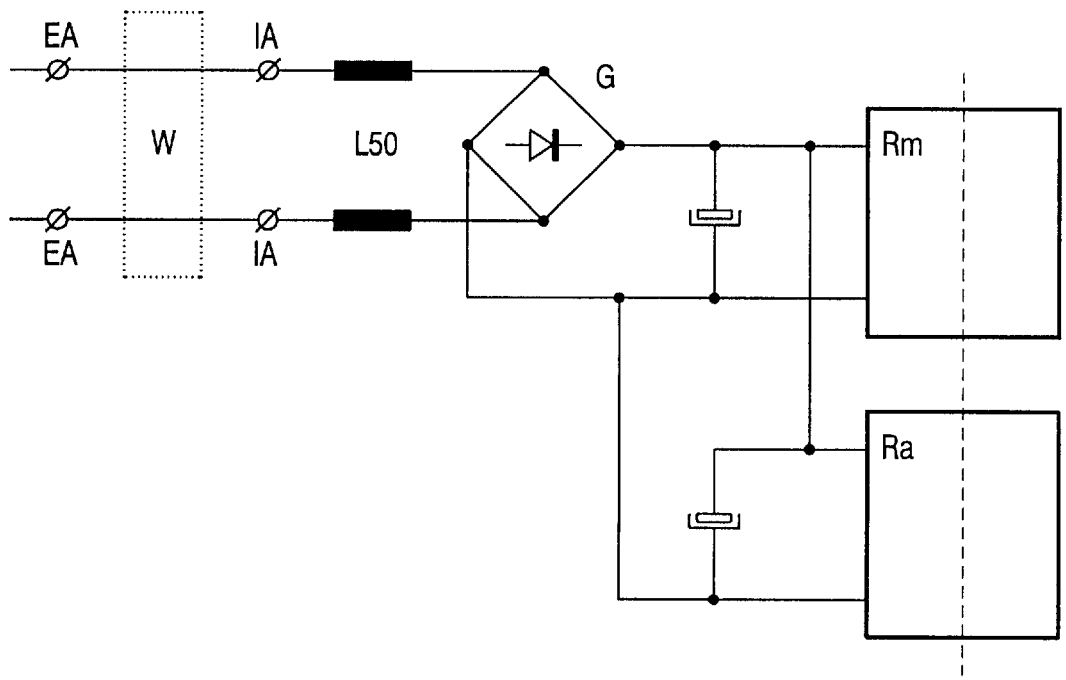
FIG. 1 shows a known circuit for supplying power to two devices.

FIG. 1 shows a known circuit for supplying DC voltage to two devices Rm, Ra, this DC voltage being obtained from an AC voltage source by conversion. This circuit corresponds to that of FIG. 2 in which the two devices Rm, Ra are connected in parallel to the outputs of the rectifier module G.

Figure 2:
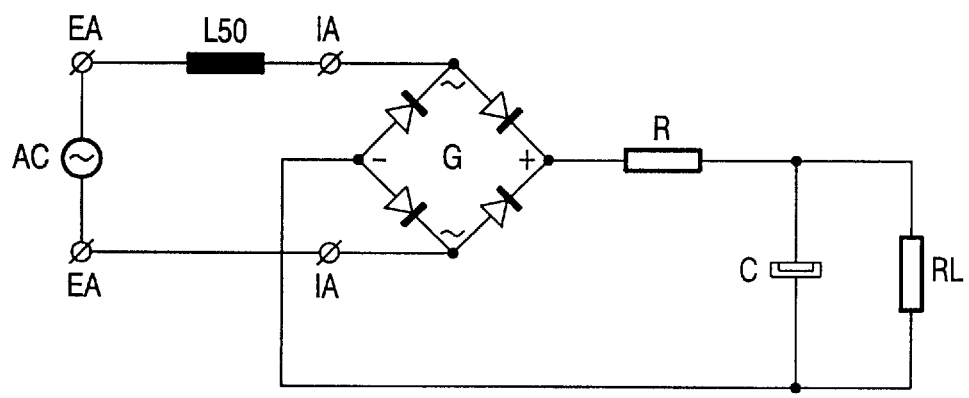
FIG. 2 shows a known circuit for supplying power to one device.

FIG. 2 shows, in more detail, the prior-art circuit for supplying DC voltage to a device RL. The power is taken from an AC voltage source AC and is converted by a rectifier module G into a non-stabilized or fluctuating (subject to ripple) DC voltage. The AC voltage is fed to the rectifier through the input terminals. In one of the input lines, or in both input lines, there is, moreover, a 50 Hz coil L50 for smoothing purposes. At the output terminals "+", "−" of the rectifier module G, the DC voltage can be tapped by the device RL. The two output lines to these terminals can be coupled via a smoothing capacitor C. Furthermore, an output line often contains a resistor R to achieve a limitation of the current.

The curve waveform resulting from a circuit in accordance with FIG. 1, or in accordance with FIG. 2, is shown in FIG. 3, in which the circuit is based on the following parameters: R=1.5 ohms, L50=32 mH, C=220 µF, Uin=230 V, f=50 Hz, Po=145 W. The broken line shown in FIG. 3 corresponds to the reference curve envelope of standard EN 61000-3-2, with which a classification from A and D is made. Since the waveform shown for the circuits in accordance with FIGS. 1 and 2 remains within the reference curve form, it meets the requirements of class D in accordance with EN 61000-3-2.

Figure 4:
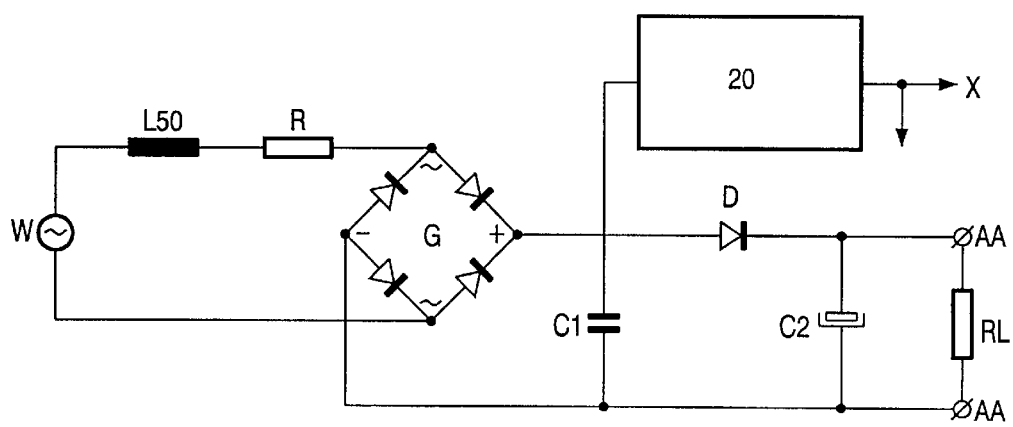
FIG. 4 shows a circuit in accordance with the invention.

FIG. 4 shows a circuit in accordance with the invention for supplying power to a device RL. In this circuit, the required energy is taken from the line voltage supply W via the inputs ("~") of a rectifier module G. In this case, it is taken via the 50 Hz coil L50 and a resistor R, which limits the input current at the switch-on time.

A small input capacitor C1 is initially provided on the output side of the rectifier module G between the DC voltage outputs ("+", "−"). Furthermore, the outputs are connected via output lines to external terminals AA to which the consumer RL can be connected. A main capacitor C2 (electrolytic capacitor) is connected in parallel with the device RL to the external terminals AA. The main capacitor C2 is isolated from the input capacitor C1 by diode D forward-biased in relation to the rectifier.

Between the "+" output of the rectifier module G and the anode of diode D, an input of an active converter 20 is coupled. Through the active converter 20, the input capacitor C1 is discharged every second half of a line voltage half-wave by or to a certain voltage. This leads to a change in the input current since this capacitor is now discharged earlier than the main capacitor. The discharge can take place by means of prior-art circuits, such as, boost or flyback (switching-regulator) circuits. The energy transported can either be added to the main capacitor or brought to the outputs X.

Figure 5:
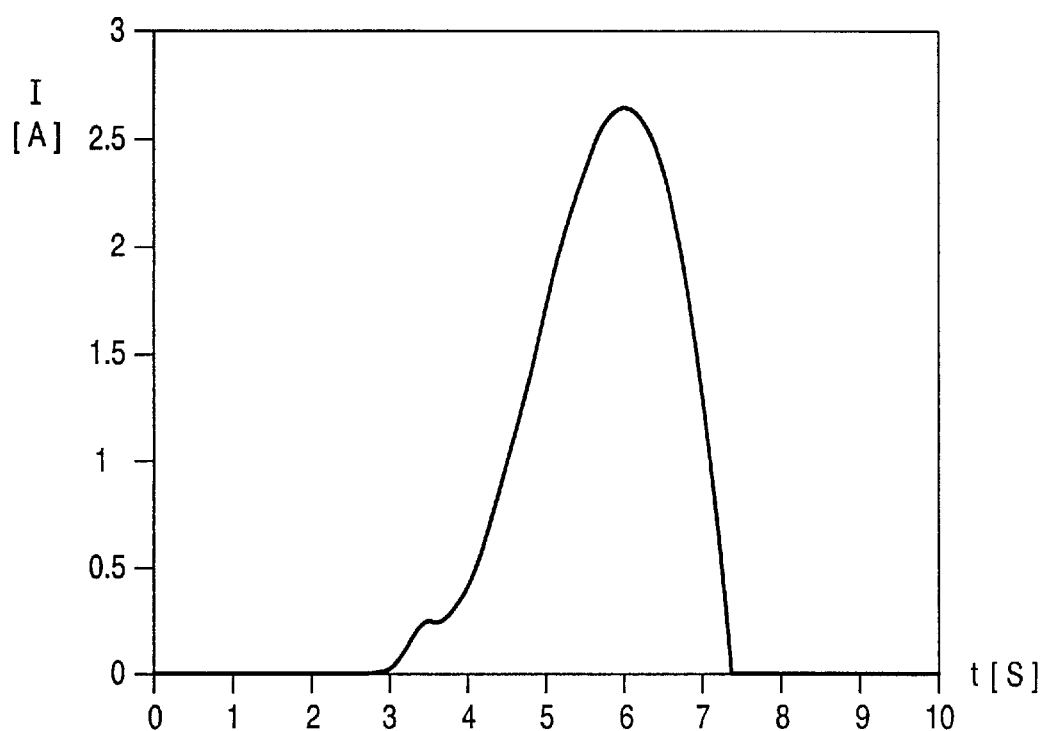
FIG. 5 shows a waveform of the current consumption with the circuit as shown in FIG. 4.

FIG. 5 shows the resulting waveform of the current consumption (50 Hz input current, one half-wave) when the circuit as shown in FIG. 4 is used. The input current has, at its left base point in the Figure, a spread that leads to a damping of the harmonics of the input current.

In the circuit shown in FIG. 4, the 50 Hz coil L50 can be reduced by more than 40%, if $(L \times I^2 / 2)$ is used as an approximation for the size of the coil.

With all the proposals, non-linear magnets can be used for further reduction of the size of the magnetic components.

| Key: | |
|---|---|
| AA | External terminal |
| AC | AC voltage source |
| C | Smoothing capacitor |
| C1 | Capacitor |
| C2 | Main capacitor |
| D | Diode |
| EA | External terminal |
| G | Rectifier |
| I | Current |
| IA | Internal terminal |
| L50 | 50 Hz coil |
| R | Ohmic resistance |
| RL | Consumer |
| Rm, Ra | Consumers in the first/second input path |
| t | Time |
| W | AC voltage supply |

What is claimed is:

1. A circuit for converting an AC voltage into a DC voltage for at least one device, the circuit comprising:
   an AC voltage supply;
   a rectifier module having two inputs connected to the AC voltage supply, and two outputs connected two output lines with external terminals for coupling to at least one device;
   a main capacitor connected in parallel to a device to be connected between the two external terminals of the rectifier module; and
   at least one induction coil arranged between the AC voltage supply and the rectifier module,
   characterized in that the circuit further comprises:
      a further capacitor connected in parallel to the main capacitor between the two outputs of the rectifier module;
      a diode connected in one of the output lines of the rectifier module, said diode separating the main capacitor from the further capacitor; and
      an active converter having an input connected between the diode and one of the outputs of the rectifier module, said active converter discharging the further capacitor, at least in part, in the second half of each half-wave supplied by the AC voltage supply.

2. The circuit as claimed in claim 1, characterized in that the active converter is an up-controller or up-converter or a flyback converter.

3. The circuit as claimed in claim 1, characterized in that an output of the active converter is connected to the main capacitor enabling the active converter to convey the load taken from the capacitor to the main capacitor.

4. The circuit as claimed in claim 1, characterized in that the energy carried by the active converter can be used to supply power to ICs of the switched-mode regulator of a downstream DC—DC converter.

5. The circuit as claimed in claim 1, characterized in that the energy carried by the active converter can be applied directly to a load on the line voltage-isolated side of a downstream DC—DC converter.

* * * * *